(12) United States Patent
Lucas Torralba et al.

(10) Patent No.: US 8,269,378 B2
(45) Date of Patent: Sep. 18, 2012

(54) SWITCHED RELUCTANCE LINEAR MOTOR/GENERATOR

(75) Inventors: Julio Lucas Torralba, Madrid (ES); Manuel Pinilla Martin, Madrid (ES)

(73) Assignee: Wedge Global, S.L., Santander (ES)

( * ) Notice: Subject to any disclaimer, the term of this patent is extended or adjusted under 35 U.S.C. 154(b) by 416 days.

(21) Appl. No.: 12/467,092

(22) Filed: May 15, 2009

(65) Prior Publication Data

US 2010/0033029 A1    Feb. 11, 2010

Related U.S. Application Data

(63) Continuation of application No. PCT/EP2007/009754, filed on Nov. 12, 2007.

(30) Foreign Application Priority Data

Nov. 17, 2006   (ES) .................................. 200602943

(51) Int. Cl.
    *H02K 41/00* (2006.01)
(52) U.S. Cl. .................. 310/12.15; 310/12.13
(58) Field of Classification Search ............... 310/12.13, 310/12.15, 266
    See application file for complete search history.

(56) References Cited

U.S. PATENT DOCUMENTS 3,699,365 A * 10/1972 Leitgeb ...................... 310/12.18
5,495,131 A *  2/1996 Goldie et al. .............. 310/12.15

FOREIGN PATENT DOCUMENTS

EP           0 527 593 A      2/1993

* cited by examiner

*Primary Examiner* — Dang Le
(74) *Attorney, Agent, or Firm* — Arent Fox LLP

(57) ABSTRACT

The invention consists on a linear switched reluctance electrical machine that may be operated indistinctly as a generator or a motor, with a series of characteristics that allow the optimization of the mass to power ratio, as well as the manufacturing cost. The machine has several air gaps, crossed by a single magnetic flux, in which the magnetic force is obtained. This flux is fed by a set of coils (6) placed in the active parts, these active parts are two yokes (4) and (5) in which the magnetic flux closes, there might be other active parts in the mentioned magnetic circuit through which the magnetic flux does not close. A set of passive elements, normally the translators (1) and (2), produce, while moving relatively to the active part, a variation of the reluctance of the circuit with respect to the position which causes a magnetic force. The most unique characteristic of the present invention is that the magnetic flux only returns through the two outermost active parts (4-5), allowing the desired reduction in mass, weight and cost.

3 Claims, 2 Drawing Sheets

SWITCHED RELUCTANCE LINEAR MOTOR/GENERATOR

CROSS-REFERENCE TO RELATED APPLICATION

This application is a Continuation of International Application No. PCT/EP2007/009754, filed Nov. 12, 2007, which claims priority to Spanish Application No. P200602943, filed Nov. 17, 2006, the disclosure of the prior applications is hereby incorporated in their entirety by reference.

OBJECT OF THE INVENTION

The present invention refers to a high specific power switched reluctance machine, which may behave as a motor or generator, being in any case linear. Such a machine has some characteristics that make its manufacturing very economical, and it may be applied wherever it is necessary to perform an actuation or extract power from an external mechanical source; being specially well adapted to circumstances when it is necessary to minimize the ratio between the power delivered or extracted and the weight or cost.

A preferred application field of the present invention is the power generation from ocean energy coming from the sea level fluctuations created by the waves, although it is applicable to any other conditions requiring a similar performance.

BACKGROUND OF THE INVENTION

In the preferred application field of the present invention that was mentioned in the previous paragraph i.e. the power generation from ocean energy coming from the sea level fluctuations; there are energy extraction systems based on a buoy made of two parts, one of them floats freely following the sea surface, while the other has a reduced oscillation amplitude with respect to the first; this causes the relative movement to be reciprocating, making possible to extract energy from the buoy-sea system. The main characteristic of this movement is the presence of large forces and small velocities, which is a big difficulty for an efficient energy extracting device.

As it is well known, the waves are caused by the uninterrupted action of wind over large ocean surfaces. They travel for thousands of kilometres with almost no energy dissipation. Wave energy is characterised by being more predictable and concentrated than wind energy, so that the waves are an important energetic world resource. The estimated global wave power resource is 2 TW, which corresponds with the average world electric power consumption.

The traditional solution for extracting energy from systems characterised by a large force to speed ratio, is based on the use of hybrid hydraulic, mechanical and electrical systems. These systems are complex and their maintenance in a hostile environment may be very expensive. The availability of such a complex system, made of so many mechanical parts is necessarily lower, especially due to the reciprocating movement.

On the other hand, in the usual designs of switched reluctance electrical machines, the magnetic flux, created by the coils, closes after crossing only one air gap between the translator and the stator, which forces these components to have a large mass of ferromagnetic material for this purpose.

Stated in a more concrete way, in conventional switched reluctance machines, each coil only creates magnetic flux in one air gap, with the implication of not using a large amount of ferromagnetic material, with the derived consequences of larger cost and weight.

We can mention the existence of other electrical machines for direct energy generation from wave oscillations, which use rare earth permanent magnets in the translator, causing that the cost of the machine is rather high. Even in absence of an external grid, these machines have an open circuit voltage during operation, making its maintenance more dangerous and causing the partial disconnection of one of its phases, in case of failure, to be impossible. Other design of a linear machine has been proposed by the Uppsala University (Sweden), based on permanent magnets placed on an octagonal section and with distributed windings in the stator, a really more expensive and difficult to manufacture solution.

The European patent application EP 0 527 593 is relevant with respect to the present invention. This application describes an electric actuator motor comprising: a housing; a plurality of stator portions adapted within said housing, wherein each of said stator portions includes a plurality stator poles; a plurality of rotors movable between said stator portions; and electromagnetic means for moving said rotors between said stator portions. Nevertheless, this application fails to teach the possibility of including coils in the central stator.

The absence of the coils in the intermediate stators turns the topology of the machine into really non-scalable ad infinitum structure, due to the stray field of the coil-less central poles. Consequently, the ratio of aligned to non-aligned inductance increase at a much slower path than the number of translators. The use of coils in the central stators that we propose for the first time in this application creates a periodic structure which does not suffer from any problem of stray field in the central stators. Otherwise, the applicability of the multitranslator switched reluctance machine is limited to one central stator not equipped with coils. It is the introduction of the central coils which open the field of applications requiring hundred of kN of force in structures of limited length. In other words, the improvement is not only the additional magnetomotive force introduced in the central stators, but an improvement in the magnetic circuit. We have verified this statement in finite element models, obtaining substantial improvements with respect to the solution without coils in obtaining substantial improvements with respect to the solution without coils in the central stators.

Thus, the objective technical problem that the present invention has to solve is the reduction of the stray flux in the poles in order to increase the scalability of the motor structure ad infinitum and to increase the force to weight ratio.

DESCRIPTION OF THE INVENTION

The generator/motor proposed in the present invention, i.e. the proposed linear switched reluctance machine, is a purely electromechanical, highly advantageous solution for the electrical power generation in environments similar to those previously described, providing, therefore, a higher availability and a relatively much lower maintenance cost with respect to the systems known up to the present.

The general operation of the machine proposed in this invention is similar to a switched reluctance machine, so that, a set of coils is powered in synchrony with the displacement of the moving part, therefore, the corresponding phases are powered when the magnetic reluctance is increasing or decreasing according to the operation in generator or motor mode, respectively.

The modification with respect to a conventional switched reluctance machine allows a large improvement on its functionality when it is necessary to obtain a large force to weight ratio, as it is the case in the aforementioned application of marine energy generation. By eliminating the parts of the machine not directly related to the air gap force generation, a large economy in material and a huge increase in achievable power density are obtained. On the other hand, the machine object of the present invention allows the translator structure, which is longer, to be highly economic; the increase of useful run in the machine only implies a small additional cost.

With this purpose, and in more concrete way according with the design of the present invention, the same magnetic flux crosses over several air gaps, linking one family of translators to other family of stators, and closing only in two stators or extremity translator, hereinafter called "the yokes". On each air gap, it is possible to obtain force by switching the appropriate phases, so that, the ratio between the achievable force and the machine weight is very high.

The coils may be attached to the stator or the translator. In case the coils are attached to the translator, it will be necessary to use slip rings or flexible connections. In the present invention, several air gaps and coils are put in series, as it may be observed in the corresponding drawings that we will mention afterwards.

The invention may be applied to any number of translator and stator poles compatible with the operation of the switched reluctance machine, as well as to any number of translators and stators. Likewise, it may be applied to a laminated or massif ferromagnetic structure.

An inherent advantage of the invention is the passive structure being extremely cheap and light once it is only made from massif or laminated ferromagnetic material. Such an improvement causes the scaling of the machine to longer runs to be very economic. Likewise, the machine has a low inertia of the passive part (in case it is the translator), which makes it very attractive for actuators requiring a long run and a fast acceleration.

Both the active and passive elements may have a mechanical reinforcement without affecting its magnetic behaviour.

In order to reduce the iron losses, the projected material for the translators and the stators will be magnetic laminations, although in very low speed applications solid magnetic iron may be used. Coils will be manufactured from enamelled copper in order to provide the turn insulation. On the outside of the coils, a ground insulation made of epoxy impregnated fibre glass will be applied. All coils will be series connected in order to reduce the number of terminals.

The guidance of the sliding between the translators and the stators will be implemented with rails and sliding units in a way similar to elevators.

The machine must be driven by way of power electronic equipment, which is responsible of closing or opening each phase at the corresponding stage (moment) in which the reluctance variation is appropriate, increasing reluctance in motor mode and decreasing reluctance in generator mode. A set of presence sensors detect the relative position between the translator and the stator in order to synchronize the movement of the machine with the operation of the power electronic drive.

As it may be appreciated according to the previously mentioned reasons, there are many fields of industrial applications of the present invention, both as a generator or an actuator. The characteristics of the presented design make it exceptionally appropriate for mass production by way of using the standard techniques of electrical machine manufacturing.

The design of the machine proposed by the present invention is highly scalable to larger powers, once its power may be increased by the enlargement of any of its three dimensions: the number of poles in the active part, the width of the machine and the number of intermediate translators and stators. Therefore, the power that this machine may generate is proportional to the volume of its active part. This referred power increase may be performed only by the increase in the number of identical parts.

DESCRIPTION OF THE DRAWINGS

To complement the description that is being made and in order to help with the understanding of the invention characteristics according to a preferred embodiment example, a set of drawings corresponding to this preferred embodiment is also included. This embodiment is given for clarification purposes and, consequently, it is not limitative of the scope of the invention.

PREFERENT EMBODIMENT OF THE INVENTION

Figure 1:
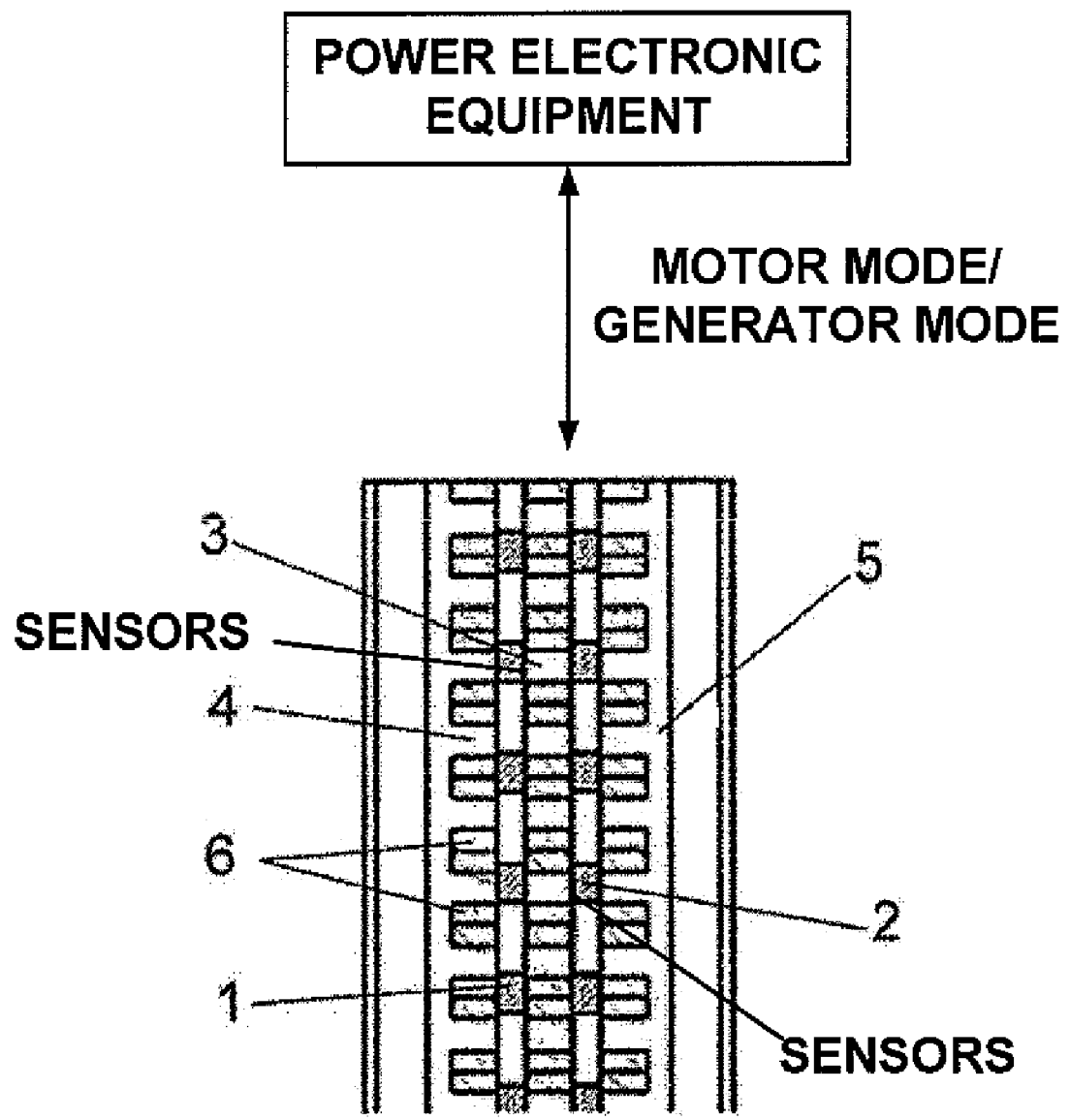
FIG. 1 shows a schematic representation of a linear switched reluctance machine made according to the present invention, that is, a machine built with two translators and an intermediate stator.

As it has been previously mentioned, FIG. 1 shows a machine with two translators (1) and (2), moving in unison thanks to a, non represented, mechanical linkage between them. An intermediate stator (3), placed in between translators (1) and (2), and two yokes (4) and (5), static as well, apply a force on both translators at the same time. The reference (6) identifies the corresponding coils.

Figure 2:
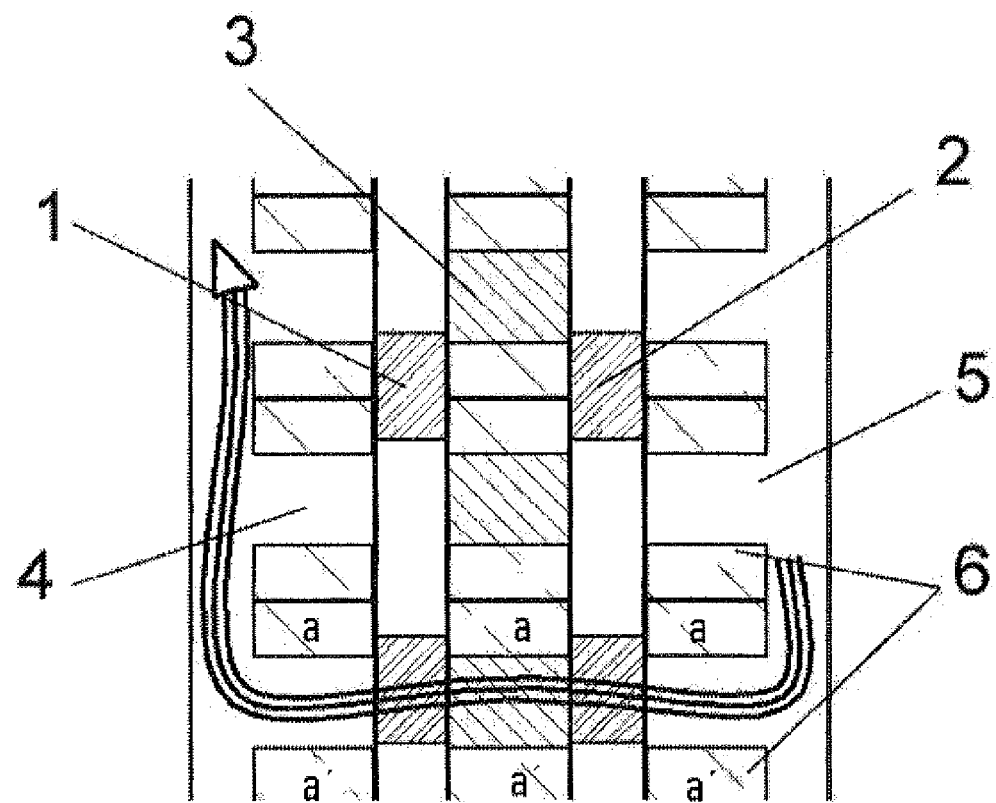
FIG. 2 shows, pursuant to a schematic way, the magnetic flux flow through the machine described in the previous figure.

On the other hand, FIG. 2 shows the magnetic flux, represented with an arrow, circulation through the machine; this flux is created by the current circulating in phase (a), whose coils (6) are indicated by the blocks referenced by (a) and (a'), corresponding to both sides of one coil. As it may be observed in FIG. 2, the same flux, fed by the magneto-motive force of the coils attached to the yokes (4) and (5) and the intermediate stator (3), only returns once through the yokes (4) and (5). Be aware that the return path is not represented in FIG. 2, only the flux crossing right to left has been represented in this figure. The flux will, eventually, close left to right, through another set of coils.

In the mentioned FIG. 2, it is possible to observe the large power density that may be achieved by the topology of the present machine, which eliminates a large amount of material that in conventional designs are required for the return of the magnetic flux, but without producing any magnetic force. Likewise, the machine of the present invention shows an important economic advantage due to the huge amount of unnecessary material that may be eliminated.

This is possible according to the Maxwell's laws, because the field lines will eventually close on themselves forming a closed path, not that they close everywhere. The differential divergence law only states that the same flux entering a differential volume must exit it. It is up to designer of the magnetic system to create a path as efficient as possible. So, in FIG. 1 and FIG. 2 the objective is to obtain a very efficient magnetic circuit in which a maximum number of air gaps are used for creating the desired effect. The actual path of the field lines will depend on the configuration of ferromagnetic materials, coils and air gaps described before.

According to an example of practical embodiment of the invention, a linear switched reluctance machine would be the three phase machine, with six poles in the stator corresponding to four poles in the translator, the most commonly machine used in the rotating machines and perfectly adapted to the linear switched reluctance machine. The design which corresponds to the aforementioned drawings is based on two outermost stators, the aforementioned yokes (4) and (5), and a central stator (3), all of them with poles to whom the concentrated coils (6) are attached. Between each pair of stators a translator (1-2) is located. All the translators are mechanically linked and moved, therefore, in unison.

The invention claimed is:

1. A linear switched reluctance motor/generator, comprising:
    at least two translators and at least one stator, wherein the stator is disposed between the two translators;
    two yokes with poles to which coils are attached so that magnetic flux created by the coils crosses the translators and the stator to close in itself; and
    several air gaps,
    wherein the magnetic flux only closes through the two yokes, defined by two outermost stators, or two outermost translators, the magnetic flux being mostly perpendicular to air gaps of intermediate ferromagnetic elements;
    the motor/generator is driven by a power electronic equipment configured to: close or open each phase at corresponding moments in which a reluctance variation is appropriate, increase a reluctance in a motor mode, and decrease the reluctance in a generator mode; and
    the at least one stator comprises poles, and a set of intermediate coils are attached to the poles and configured to create additional flux and guide the magnetic flux through interior portions of the coils.

2. The linear switched reluctance motor/generator according to claim 1, further comprising a set of presence sensors to detect relative positions between the translators and the stator.

3. The linear switched reluctance motor/generator according to claim 1, wherein the translators move in unison due to a mechanical linkage, and the translators are configured to be crossed by the magnetic flux, so that the forces acting upon the translators accumulate.

* * * * *